United States Patent Office 2,721,143
Patented Oct. 18, 1955

2,721,143

3-PHENYL PYRAZOL COMPOUNDS AND PRESERVED COMPOSITION CONTAINING SAID COMPOUNDS

Helmut Kraft, Mannheim, and Kurt Kraft, Heidelberg, Germany, assignors to Knoll A.-G. Chemische Fabriken, Ludwigshafen am Rhine, Germany, a corporation of Germany No Drawing. Application November 15, 1951, Serial No. 256,602

Claims priority, application Germany November 18, 1950

9 Claims. (Cl. 99—222)

This invention relates to pyrazol compounds, and more particularly to substituted 3-phenyl pyrazol compounds and a method of making same.

One object of this invention is to provide valuable 3-phenyl pyrazol compounds having strong antiseptic and disinfecting activity against microorganisms as well as considerable fungicidal properties.

Another object of this invention consists in providing a simple and economic method of producing such compounds.

Other objects of this invention will become apparent from the specification and the claims annexed hereto.

The new compounds are 3-phenyl pyrazol compounds of the following structural formula:

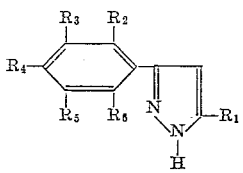

In this formula:

$R_1$ indicates hydrogen or an alkyl radical with 1 to 5 carbon atoms including lower alkyl radicals, such as methyl, ethyl, propyl, butyl, isobutyl, amyl radicals;

$R_2$ a hydroxyl group, an alkoxy group which may be substituted by an alkyl amino group, or halogen, such as chlorine, bromine;

$R_3$ a nitro, amino, or sulfhydryl group;

$R_4$ a hydroxyl, amino, or alkyl group;

$R_5$ a nitro, amino, alkyl group, or halogen; and $R_6$ an alkyl group. $R_2$ to $R_6$ may also be hydrogen.

Compounds of this type, either as such or in the form of their salts with inorganic or organic acids, represent highly effective bactericides and fungicides useful in the preservation of foodstuffs, glue and gelatine, leather, and other goods. An outstanding example of such compounds is 3-(2-hydroxy phenyl) pyrazol of the following formula:

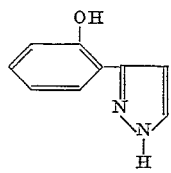

The new compounds are produced, for instance, by reacting ω-acylated acetophenones which may be substituted, according to the above given formula, by nitro, amino, sulfhydryl, alkyl groups, and preferably in 5-position by halogen, with a hydrazino compound, i. e. with a compound having a hydrazino group in its molecule. Such compounds are capable to cause ring closure of said ω-acylated acetophenones to a pyrazol ring. A suitable hydrazino compound of this type is semicarbazide hydrochloride. The new bases form salts with acids, especially with mineral acids. Such salts, in contrast to the bases, have a greater solubility in water. While, for instance, 3-(2-hydroxy phenyl) pyrazol has a solubility in water of only about 0.1%, 50% aqueous solutions of its hydrochloride may be prepared.

The new compounds are colorless, practically odorless and, at least in those concentrations in which they are used, tasteless crystalline compounds. These qualities and physical properties permit their wide use as bactericidal and fungicidal preserving agents. They may be employed in solid form as well as in solution or emulsion or in admixtures with other active or inert susbtances. Especially suitable are the new compounds as preserving agents in fruit juices, jams, marmalades, vegetable preserves, but they may also be used for technical purposes, for instance, for preserving leather goods, glue, adhesives and others.

The following ω-acylated acetophenones may be used, for instance, as starting materials:
2-hydroxy-5-bromo benzoyl acetone,
2-hydroxy-5-chloro benzoyl acetone,
2-hydroxy benzoyl acetone,
3-nitro benzoyl acetone,
ω-Formyl-o-hydroxy acetophenone,
2-hydroxy-5-bromo-ω-formyl-acetophenone,
2-hydroxy-5-bromo-ω-propionyl acetophenone,
2-hydroxy-4,6-dimethyl benzoyl acetone,
2-hydroxy-5-chloro-ω-formyl acetophenone,
2,4-dihydroxy benzoyl acetone,
2-aethoxy benzoyl acetone,
2-hydroxy-3-nitro benzoyl acetone,
2-hydroxy-5-aethyl-ω-formyl acetophenone,
2-hydroxy-5-nitro benzoyl acetone,
2-hydroxy-ω-valeryl acetophenone, and
2-hydroxy-5-bromo-ω-stearyl acetophenone.

The reaction with semicarbazide hydrochloride is preferably carried out in aqueous-alcoholic solution. One may use, in the place of semicarbazide hydrochloride, hydrazine hydrate, preferably in the form of a 25% aqueous solution, or thiosemicarbazide hydrochloride.

In order to produce 2-dialkylamino alkoxy phenyl pyrazol compounds the corresponding 2-hydroxy phenyl pyrazol compound is reacted with a dialkylamino alkyl halogenide. The 2-, 4-, and/or 5-amino substituted phenyl pyrazol compounds are obtained by reducing the corresponding nitro compounds. The amino compounds may be converted into the sulfhydryl compounds by diazotizing said amino compounds and reacting the diazonium salt with alkyl xanthogenate.

The new phenyl pyrazol bases form salts with inorganic as well as organic acids. Especially valuable are the salts with substantially non-toxic acids, such as the inorganic acids, hydrochloric acid, sulfuric acid, phosphoric acid, or the lower fatty acids, such as formic acid, acetic acid and the like organic acids. The bases are less soluble in water, but they possess a high solubility in a number of organic solvents and in fats and oils.

The following examples serve to illustrate the invention without, however, limiting the same to them.

Example 1

3-(2-hydroxy phenyl) pyrazol.

33 cc. of a 25% aqueous solution of hydrazine hydrate are slowly added, while stirring, to a solution of 26.7 g. of 2-hydroxy-ω-formyl acetophenone in 100 cc. of methanol. The reaction mixture is heated on a water bath for one hour and is then poured into 500 cc. of water. 15 g. of crude 3-(2-hydroxy phenyl)) pyrazol precipitate. They are recrystallized from water in the presence of decolorizing carbon. Melting point of the pure base: 98–99° C.

To convert the same into the hydrochloride, 5 g. of said base are dissolved in 50 cc. of ether. Gaseous hydrochloric acid is passed through said solution, whereby an oil precipitates. Said oil crystallizes after a short period of time. Melting point of the resulting hydrochloride of 3-(2-hydroxy phenyl) pyrazol after recrystallisation from a mixture of alcohol and ether (1:5): 158–164° C.

Only 0.1% of the free base is soluble in water while its hydrochloride has a solubility of about 50%. The base is readily soluble in most organic solvents, such as methanol, ethanol, acetone, chloroform, ether or benzene. It is difficultly soluble in petroleum ether. Its hydrochloride is also readily soluble in methanol and ethanol and difficultly soluble in acetone, ether, petroleum ether or chloroform.

3-(2-hydroxy phenyl) pyrazol, is effective against *Staphylococcus aureus* in concentrations of 0.001–0.01%. It possesses furthermore a high fungicidal activity. It inhibits, for instance, the growth of *Penicillium glaucum* in concentrations of 0.002–0.01%.

*Example 2*

3-(2-hydroxy-5-chloro phenyl) pyrazol.

12 cc. of a 25% aqueous hydrazine hydrate solution are slowly added, while stirring, to a solution of 11.1 g. of 2-hydroxy-5-chloro-ω-formyl acetophenone in 50 cc. of methanol. The reaction mixture is heated on a steam bath for 1 hour and is then poured into 250 cc. of water. 7.5 g. of crude 3-(hydroxy-5-chloro phenyl) pyrazol precipitate. The base, after recrystallisation from hot water in the presence of decolorizing carbon, has a melting point of 150–152° C.

*Example 3*

3-(2-hydroxy-5-bromo phenyl) pyrazol.

15 g. of 2-hydroxy-5-bromo-ω-formyl acetophenone, obtained by condensing 2-hydroxy-5-bromo acetophenone with formic acid ethyl ester in the presence of metallic sodium, are dissolved in 50 cc. of methanol and are boiled under reflux with 13 cc. of a 25% aqueous hydrazine hydrate solution for 2 hours. On diluting the reaction mixture with water, 14 g. of 3-(2-hydroxy-5-bromo phenyl) pyrazol precipitate. Melting point after recrystallisation from trichloro ethylene: 157–159° C.

*Example 4*

3-(2-hydroxy-5-bromo phenyl)-5-methyl pyrazol.

5.1 g. of 2-hydroxy-5-bromo benzoyl acetone, obtained by condensing 2-hydroxy-5-bromo acetophenone with acetic acid ethyl ester, are dissolved in a mixture of 20 cc. of ethanol, 10 cc. of water, and 5 cc. of glacial acetic acid. 2.3 g. of semicarbazide hydrochloride are added to said solution and the reaction mixture is heated on a steam bath for 2 hours. On diluting the reaction solution with water, 3.5 g. of 3-(2-hydroxy-5-bromo phenyl)-5-methyl pyrazol precipitate. Melting point, after recrystallisation from trichloro ethylene: 158–159° C.

*Example 5*

3-(2-hydroxy-5-bromo phenyl)-5-methyl pyrazol.

5.1 g. of 2-hydroxy-5-bromo benzoyl acetone are dissolved in 45 cc. of methanol. 4 cc. of a 25% aqueous hydrazine hydrate solution are added thereto and the mixture is heated on a steam bath. After diluting the reaction solution with water, 5 g. of 3-(2-hydroxy-5-bromo phenyl)-5-methyl pyrazol precipitate. Melting point, after recrystallisation from trichloro ethylene: 158–159° C.

*Example 6*

3-(2-hydroxy-5-chloro phenyl)-5-methyl pyrazol.

5 g. of 2-hydroxy-5-chloro benzoyl acetone are dissolved in 40 cc. of methanol. 5 g. of a 25% aqueous solution of hydrazine hydrate are added to said solution and the mixture is heated on a steam bath for 1 hour. 4.5 g. of 3-(2-hydroxy-5-chloro phenyl)-5-methyl pyrazol precipitate on diluting the reaction solution with water. Melting point, after recrystallisation from trichloro ethylene: 160–161° C.

*Example 7*

3-(2-hydroxy phenyl)-5-methyl pyrazol.

10 g. of 2-hydroxy benzoyl acetone are dissolved in 50 cc. of methanol. 24 cc. of a 25% aqueous hydrazine hydrate solution are added thereto and the mixture is heated on a steam bath for 1 hour. 8.8 g. of 3-(2-hydroxy phenyl)-5-methyl pyrazol precipitate on diluting the reaction solution with water. Melting point, after recrystallisation from dibutyl ether: 133–134° C.

*Example 8*

3-(2-hydroxy-5-bromo phenyl)-5-ethyl pyrazol.

2.7 g. of 2-hydroxy-5-bromo-ω-propionyl acetophenone, obtained by condensing 2-hydroxy-5-bromo acetophenone with propionic acid ethyl ester in the presence of metallic sodium, are dissolved in 20 cc. of methanol. Said solution is boiled under reflux with 3 cc. of a 25% aqueous hydrazine hydrate solution for 2 hours. 1.5 g. of 3-(2-hydroxy-5-bromo phenyl)-5-ethyl pyrazol precipitate on diluting said reaction solution with water. Melting point, after recrystallisation from methanol: 122° C.

*Example 9*

3-(2-hydroxy-4,6-dimethyl phenyl)-5-methyl pyrazol.

20.6 g. of 2-hydroxy-4,6-dimethyl benzoyl acetone, obtained by condensing 2-hydroxy-4,6-dimethyl acetophenone with acetic acid ethyl ester in the presence of metallic sodium, are dissolved in 100 cc. of methanol. The solution is boiled under reflux with 25 cc. of an aqueous hydrazine hydrate solution for 2 hours. 16 g. of 3-(2-hydroxy-4,6-dimethyl phenyl)-5-methyl pyrazol precipitate on diluting said reaction solution with water. Melting point, after recrystallisation from trichloro ethylene: 137° C.

*Example 10*

3-(2-hydroxy phenyl) pyrazol.

9 g. of hydrazine sulfate are added to a solution of 10 g. of 2-hydroxy-ω-formyl acetophenone in 100 cc. of 2 N sodium hydroxide solution. The mixture is heated on a steam bath for 2 hours, and is then acidified with 2 N hydrochloric acid. The insoluble precipitate is removed by filtration. The filtrate is neutralized with a saturated sodium carbonate solution whereby 3-(2-hydroxy phenyl) pyrazol precipitates. The precipitate is filtered off by suction and is washed with water. Yield: 4.9 g.

*Example 11*

3-(3-nitro phenyl)-5-methyl pyrazol and 3-(3-amino phenyl)-5-methyl pyrazol.

62 g. of 3-nitro benzoyl acetone are dissolved in 300 cc. of methanol. 126 cc. of a 25% aqueous solution of hydrazine hydrate are added to said solution and the mixture is heated on a steam bath for 1 hour. On diluting the reaction solution with water, 3-(3-nitro phenyl)-5-methyl pyrazol precipitates. Its melting point, after recrystallisation from a mixture of methanol and water, is 144° C.

39 g. of said 3-(3-nitro phenyl-5-methyl pyrazol are dissolved in 500 cc. of acetic acid ethyl ester. The solution is hydrogenated in an autoclave in the presence of 20 g. of Raney nickel catalyst at 20° C. and under a pressure of 20 atmospheres. As soon as the required amount of hydrogen is absorbed, the solvent is evaporated. The residue crystallizes. Yield: 30 g. of 3-(3-amino phenyl)-5-methyl pyrazol corresponding to 91% of the theoretical amount. Melting point, after recrystallisation from a mixture of benzene and acetic acid ethyl ester (1:1): 91° C.

For the reduction of the nitro group to the amino group the other customary chemical reducing agents, especially nascent hydrogen, are also applicable.

Example 12

3-(3-mercapto phenyl)-5-methyl pyrazol.

13.2 g. of 3-(3-amino phenyl)-5-methyl pyrazol, obtained according to Example 12, are dissolved in 25 cc. of concentrated hydrochloric acid. Said solution is diazotized with a solution of 5.3 g. of sodium nitrite in 10 cc. of water at a temperature of between 0° C. and 5° C. To said diazonium salt solution there is added, drop by drop, while stirring, a solution of 12.2 g. of potassium ethyl xanthogenate in 30 cc. of water, said solution being previously cooled to 0° C. Thereafter the reaction mixture is allowed to stand at 40° C. for 1 hour and is then extracted with ether. The ethereal extract is evaporated in a vacuum and the resulting viscous oil is dissolved in 30 cc. of ethanol. A solution of 8.9 g. of potassium hydroxide in 50 cc. of ethanol is added to said solution and the mixture is heated under reflux for 2 hours. The reaction mixture is then diluted with 200 cc. of water and is acidified with 2 N sulfuric acid. 3-(3-mercapto phenyl)-5-methyl pyrazol precipitates. On recrystallisation from a mixture of methanol and water (1:1) it is obtained in the form of colorless crystals having a melting point of 133° C.

Example 13

3 - (2-β-diethylamino ethoxy-5-bromophenyl)-5-methyl pyrazol.

5.5 g. of 3-(2-hydroxy-5-bromo phenyl)-5-methyl pyrazol, obtained according to Example 5, 6.2 g. of β-diethylamino ethyl chloride, 13 g. of anhydrous potassium carbonate, and 50 cc. of acetone are boiled under reflux for 20 hours. After evaporating the acetone, the residue is dissolved in 2 N hydrochloric acid. The solution is extracted with ether. The aqueous layer is then rendered alkaline and is again extracted with ether. The ether extract is dried over sodium sulfate and gaseous hydrochloric acid is introduced into said extract. The dihydrochloride of the 3-(2-β-diethylamino ethoxy-5-bromo phenyl)-5-methyl pyrazol precipitates as oil. It crystallizes after standing for a longer period of time. Its melting point, after recrystallisation from a mixture of alcohol and ether (1:5), is 186–187° C.

Example 14

3-(2-hydroxy-5-bromo phenyl)-5-propyl pyrazol.

This compound is obtained in the same manner as described in Example 9 by using 2.85 g. of 2-hydroxy-5-bromo-ω-n-butyryl acetophenone as starting material.

Example 15

3-(2-hydroxy-5-bromo phenyl)-5-n-butyl pyrazol.

This compound is obtained in the same manner as described in Example 9 by using 3.0 g. of 2-hydroxy-5-bromo-ω-n-valeryl acetophenone as starting material.

Example 16

3-(2-ethoxy phenyl)-5-methyl pyrazol.

This compound is obtained in the same manner as described in Example 5 by using 4.1 g. of 2-ethoxy benzoyl acetone as starting material.

Example 17

3-(4-methoxyphenyl)-pyrazol.

62 g. of 4-methoxy-4-formyl-acetophenone, prepared by condensation of p-methoxyacetophenone with formic acid ethyl ester in the presence of sodium ethylate, are dissolved in 100 cc. of methanol and boiled under reflux for 2 hours with 75 cc. of hydrazine hydrate. When diluting with water 60 g. of 3-(4-methoxyphenyl)-pyrazol are precipitated. Melting point, after recrystallisation from methanol: 126–127° C.

By boiling said compound with concentrated hydrobromic acid, the methoxy group is split up and 3-(4-hydrophenyl)-pyrazol is obtained:

20 g. of 3-(4-methoxyphenyl)-pyrazol are boiled with 50 cc. of concentrated hydrobromic acid for 8 hours under reflux. After diluting with water the solution is made alkaline by means of sodium carbonate solution; thereby 13 g. of 3-(4-hydroxy-phenyl)-pyrazol are precipitated. Melting point, after recrystallisation from water: 175–176° C.

Example 18

3-(2-hydroxy-5-bromo-phenyl)-5-methylpyrazol.

25.7 g. of 2-hydroxy-5-bromobenzoylacetone are heated with 10 g. of thiosemicarbazide in a mixture of 50 cc. of acetic acid and 20 cc. of water on a steam bath for 2 hours. On dilution with water and neutralization with sodium carbonate solution, 20.1 g. of 3-(2-hydroxy - 5 - bromophenyl)-5-methylpyrazol are precipitated. Melting point, after recrystallisation from dichloroethylene: 158–159° C.

Example 19

3-(2-hydroxy-5-chlorophenyl)-pyrazol.

5 g. of 3-(2-hydroxy-5-chlorophenyl)-pyrazol-5-carboxylic acid obtained by condensation of 2-hydroxy-5-chloroacetophenone with oxalic acid diethylester in the presence of sodium ethylate are kept at melting temperature for 15 minutes. When pouring the molten mass into a dilute sodium carbonate solution, 3.1 g. of 3-(2-hydroxy-5-chloro-phenyl)-pyrazol are obtained. Melting point, after recrystallisation from water: 159–160° C.

Among the most valuable compounds according to this invention there are those of the following formula:

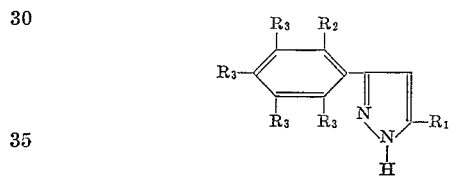

wherein $R_1$ indicates a substituent selected from the group consisting of hydrogen and an alkyl radical, $R_2$ a substituent selected from the group consisting of hydrogen, a hydroxyl group, an alkoxy group, an alkyl amino alkoxy group, and halogen, $R_3$ a substituent selected from the group consisting of hydrogen, a nitro, an amino, a sulfhydryl, a hydroxyl group halogen and an alkyl radical, whereby at least two substituents are hydrogen, and their salts.

Of course, many changes and variations in the reaction conditions may be made by those skilled in the art in accordance with the principles set forth herein and in the claims annexed hereto. Thus, other solvents than those mentioned may be used. Different concentrations of the reaction participants may be employed. The reaction temperatures may be lowered or increased and the reaction duration may be changed. The methods of working up the reaction mixtures and of purifying the reaction products may also be varied.

In place of the solvents mentioned in the examples, cyclization to pyrazol compound can also be effected in dioxane, tetrahydrofurane or acetic acid ethyl ester.

Although a solution of phenyl-hydrazine of 25% has been found to be particularly advantageous, hydrazine hydrate of any concentration can be employed for the preparation of phenylpyrazol compounds according to the present invention.

It is, of course, possible, to produce phenyl pyrazol compounds of the above given formula by other methods. Such methods are, for instance, the following methods:

Decarboxylation of the corresponding 3-phenyl-pyrazol carboxylic acids (produced by condensation of the corresponding substituted acetophenones with oxalic acid diethylester in the presence of alkali metal ethylate) by heating to melting temperature.

Employing for the pyrazol ring closure, in place of hydrazine hydrate, aryl- or alkylhydrazine, and converting the resulting 3-phenyl-N-aryl- and N-alkylpyrazols respectively by the action of oxidizing agents such as potassium permanganate or chromic acid to 3-phenyl pyrazol compound.

Allowing the corresponding substituted phenyl-ethinyl ketones to interact with hydrazine hydrate.

The new compounds possess about 10–15 times the activity of preservatives known heretofore such as salicylic acid, benzoic acid, 4-hydroxybenzoic acid-methylester.

The new compounds inhibit, for instance, the growth of *Pencillium glaucum* in the following concentrations:

| | Per cent |
|---|---|
| 3-(2-hydroxyphenyl)-pyrazol | 0.002–0.01 |
| 3-(2-hydroxy-5-bromo-phenyl)-5-methyl-pyrazol | 0.005 |
| 3-(2-hydroxy-phenyl)-5-methyl-pyrazol | 0.01 |
| 3-(2-hydroxy-5-chloro-phenyl)-pyrazol | 0.002–0.005 |

Some of the new compounds can advantageously be used for preventing infections by foreign microorganisms, for instance, in case of chemical reactions carried out under biological conditions by means of bacteria. Such reactions are, for instance, the oxidation of sugar solutions to gluconic acid by means of acetobacter suboxydans.

In practical application of the valuable bactericidal and fungicidal properties of the new substituted 3-phenyl pyrazol compounds obtained according to this invention, many methods may be employed. Solutions of the bases or of their salts in water, ethanol, aqueous ethanol, or in a mixture of ethanol, acetone and water, or in isopropyl alcohol or in a mixture of isopropyl alcohol and water may be readily made. Such solutions are very valuable as non-irritant fungicidal agents. Aqueous solutions of the salts of said new compounds, for instance of their hydrochlorides or their phosphates, are particularly suitable as preserving agents.

When preserving foodstuffs, there are added, for instance, to fruit juices 100 mg. of 3-(2-hydroxy phenyl)-pyrazol per liter, to jams and marmalades 100 mg. of the same compound per kg. Leather goods are preserved, for instance, by applying an aqueous solution of 0.1% of 3-(2-hydroxy phenyl)-pyrazol. Glue and gelatine are preserved for instance, by applying an aqueous solution of 100 mg. of the same compound.

We claim:

1. 3-(2-hydroxy phenyl) pyrazol of the following formula

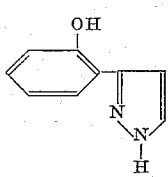

2. 3-(2-hydroxy phenyl) pyrazol hydrochloride of the following formula

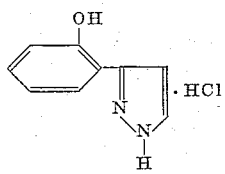

3. 3-(2-hydroxy-5-halogeno phenyl) pyrazol of the following formula

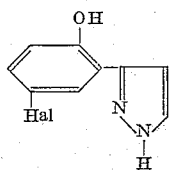

4. 3-(2-hydroxy-5-bromo phenyl) pyrazol of the following formula

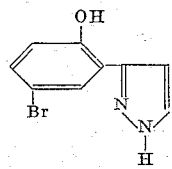

5. 3-(2-hydroxy-5-bromo phenyl)-5-methyl pyrazol of the following formula

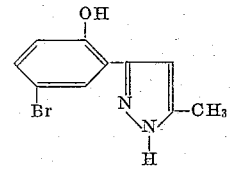

6. A foodstuff comprising, evenly distributed throughout said foodstuffs a phenyl pyrazole compound selected from the group consisting of a phenyl pyrazole compound of the following formula

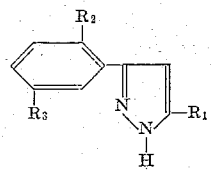

wherein $R_1$ is a substituent selected from the group consisting of hydrogen and a lower alkyl radical with 1 to 5 carbon atoms, $R_2$ is a hydroxyl group, and $R_3$ is a substituent selected from the group consisting of hydrogen and halogen, and its salts in an amount of at least 100 mg. per kg. of said foodstuff.

7. Preservative for leather, glue, gelatine, and other protein-containing material comprising an aqueous solution of at least 0.1% of a phenyl pyrazole compound selected from the group consisting of a phenyl pyrazole compound of the following formula

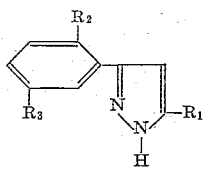

wherein $R_1$ is a substituent selected from the group consisting of hydrogen and a lower alkyl radical with 1 to 5 carbon atoms, $R_2$ is a hydroxyl group, and $R_3$ is a substituent selected from the group consisting of hydrogen and halogen, and its salts.

8. 3-(2-hydroxy-5-chloro phenyl) pyrazole of the following formula

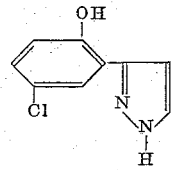

9. 3-(2-hydroxy phenyl) pyrazole compounds of the following formula

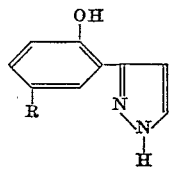

wherein R is a substituent selected from the group consisting of hydrogen and halogen, and their salts with acids.

References Cited in the file of this patent

UNITED STATES PATENTS 2,515,160  Copenhaver _____ July 11, 1950

OTHER REFERENCES

Richter, "The Chem. of Carbon Compounds," vol. IV, Elsevier Pub. Co., N. Y. 1947, pgs. 91–99.

Koenigs et al., Chem. Berichte 80, 1947, pgs. 143–149.

Bowden et al., J. Chem. Soc., 1946, pgs. 953–4.

Stedman, Bull. Nat'l. Form Comm., Sept.–Oct. 1950, vol 18, No. 9–10, pg. 153.

New and Non-Official Remedies, 1951, A. M. A., XXVII–XXXI.